United States Patent
Polishchuk et al.

(10) Patent No.: US 11,997,001 B2
(45) Date of Patent: May 28, 2024

(54) ENHANCED NETWORK LOAD ALLOCATION AND VARIANT SELECTION FOR MULTIVARIATE TESTING

(71) Applicant: Oracle International Corporation, Redwood Shores, CA (US)

(72) Inventors: Olexandr Polishchuk, London (GB); Dmytro Skorokhodov, London (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/014,789

(22) Filed: Sep. 8, 2020

(65) Prior Publication Data

US 2021/0083961 A1   Mar. 18, 2021

(51) Int. Cl.
*H04L 43/50* (2022.01)
*H04L 43/08* (2022.01)

(52) U.S. Cl.
CPC .............. *H04L 43/50* (2013.01); *H04L 43/08* (2013.01)

(58) Field of Classification Search
CPC .......... H04L 43/50; H04L 43/08; H04L 67/22
USPC ....................................................... 370/241
See application file for complete search history.

(56) References Cited

U.S. PATENT DOCUMENTS

| | | | | |
|---|---|---|---|---|
| 8,260,663 B1* | 9/2012 | Ranka | ............... | G06Q 30/0244 709/224 |
| 9,595,042 B1* | 3/2017 | Walsh | ..................... | H04L 43/55 |
| 10,977,149 B1* | 4/2021 | Zappella | ............. | G06F 11/3457 |
| 2013/0046584 A1* | 2/2013 | Yu | .......................... | G06Q 10/06 705/7.38 |
| 2014/0075336 A1* | 3/2014 | Curtis | ..................... | H04L 41/22 715/753 |
| 2016/0189207 A1* | 6/2016 | Xu | ...................... | G06Q 30/0249 705/14.48 |
| 2016/0248645 A1* | 8/2016 | Nair | ........................ | H04L 43/08 |
| 2016/0259089 A1* | 9/2016 | McKinnon | ............. | G06Q 50/02 |
| 2016/0314491 A1* | 10/2016 | Shani | ................. | G06Q 30/0275 |
| 2016/0349969 A1* | 12/2016 | Tallamy | .................. | G06F 9/451 |
| 2018/0218461 A1* | 8/2018 | Pulley | .................... | G06Q 50/12 |
| 2019/0392019 A1* | 12/2019 | Brannon | ............... | G06F 16/972 |
| 2020/0019418 A1* | 1/2020 | P K | ......................... | G06N 20/00 |

* cited by examiner

*Primary Examiner* — Kevin T Bates
*Assistant Examiner* — Ranjan Pant
(74) *Attorney, Agent, or Firm* — Mughal Gaudry & Franklin PC

(57) ABSTRACT

The present disclosure relates to systems and methods that enhance multivariate testing of interface variants by intelligently allocating network traffic to increase the speed at which samples sizes reach statistical significance. More particularly, the present disclosure relates to systems and methods that intelligently select interface variants to test against a control interface in a manner that efficiently reduces the uncertainty of sample sizes (e.g., the variance of the sample mean), thereby reaching statistical significance quicker.

22 Claims, 8 Drawing Sheets

ENHANCED NETWORK LOAD ALLOCATION AND VARIANT SELECTION FOR MULTIVARIATE TESTING

CROSS-REFERENCE TO RELATED APPLICATIONS

This application claims the priority benefit to Ukrainian Patent Application No, a201909809, which was filed on Sep. 13, 2019, at the Ukrainian Patent Office, the disclosure of which is incorporated by reference herein in its entirety for all purposes.

TECHNICAL FIELD

The present disclosure relates to techniques for performing multivariate testing of interface variants. More particularly, the present disclosure relates to techniques for intelligently distributing network traffic to interface variants to increase the speed at which testing certain interface variants reaches statistical significance.

BACKGROUND

Multivariate testing often involves testing variants of an interface against a control version of the interface to determine which version of the interface performs best. For example, if a control version of an interface is modified by (1) changing the font of text within a selectable button, and (2) changing the color presented within the selectable button, then multivariate testing can be performed to independently test the impact of each modification on a measurable metric (e.g., conversion rate). The technical challenge with existing multivariate testing, however, is that it generally takes a long time for the sample size of each of the multiple variants to reach statistically significance. Thus, existing multivariate testing is overly time consuming and prone to inaccuracies.

SUMMARY

Certain aspects and features of the present disclosure relate to techniques for intelligently distributing network traffic to interface variants (e.g., modified versions of a control interface) during multivariate testing to reduce an amount of time taken for certain interface variants to reach statistical significance. Intelligently distributing network traffic to a set of interface variants may include initially distributing network traffic uniformly across the set of interface variants. As user devices interact with each interface variant, a server may determine a parameter (e.g., an uplift) for each interface variant against a control interface, identify a subset of interface variants for which the parameter satisfies a condition (e.g., the uplift is a positive value), and select a best-performing interface variant from the subset of interface variants based on a tracked measurable metric (e.g., and, in some implementations, using artificial intelligence techniques). The server may test the selected interface variant against the control interface by redistributing the network traffic between the selected interface variant and the control interface. At a regular or irregular interval, another selection of an interface variant may be performed based on the determined parameter or other performance metrics (e.g., the previously selected interface variant may be re-selected or another interface variant may be selected). The server may again redistribute the network traffic between the newly selected interface variant and the control interface. Interface-variant selections are regularly or irregularly performed until a sample size associated with an interface variant reaches a statistical significance. The intelligent distribution of network traffic across interface variants biases routing network traffic to the best-performing interface variant, which causes the sample size associated with the best-performing interface variant to reach statistical significance faster than existing multivariate testing techniques. Additionally, as a technical point of novelty, the intelligent distribution of network traffic to certain interface variants enables the server to bias network traffic towards the best-performing interface variants, even as the performance of interface variants change from day-to-day.

To illustrate and only as a non-limiting example, a user interface (e.g., not an interface variant or a control interface) may be configured to enable a user to perform multivariate testing between a control interface and interface variants using an intelligent network traffic distribution technique, described according to certain embodiments. The intelligent network traffic distribution technique may enable the user to select a control interface, a set of interface variants, and one or more measured metrics (e.g., conversion rate or a combinatorial metric as described herein) of a website or application to track during intelligent multivariate testing. An interface variant may be a modified version of the control interface (e.g., a difference in any aspect, such as color, text, or content). Intelligently distributing network traffic across the set of interface variants and the control interface may include biasing network traffic towards the best-performing interface variant for each testing period (e.g., 24 hours) to facilitate achieving statistical significance in a quick and efficient manner. An interface variant may achieve statistical significance when a likelihood or confidence level that the interface variant (and not random chance) caused a positive or negative impact on the tracked measured metric reaches 95%. If the intelligent testing of an interface variant against the control interface indicates with statistical significance that the interface variant caused an increase in the tracked measured metric (e.g., the conversion rate) as compared to the same tracked measured metric for the control interface, then a notification may be generated for the user and presented on the user interface. That interface variant may then be removed from the set of interface variants, and the intelligent distribution of network traffic may continue across the remaining interface variants (each of which having not yet reached statistical significance). Additionally, if the intelligent testing of an interface variant against the control interface indicates with statistical significance that the interface variant caused a decrease in the tracked measured metric (e.g., the conversion rate) as compared to the control interface, then similarly a notification indicating the same may be presented on the user interface and the interface variant may be removed from the set of interface variants.

In some implementations, before the intelligent testing begins, a network load allocator may initially distribute network traffic (e.g., website visitors) uniformly across all interface variants until a minimum threshold amount of data has been collected for each interface variant. As a non-limiting example, the minimum threshold amount of data may be satisfied when one or more measured metrics have been collected for a minimum of 100 website visitors of an interface variant. After the threshold has been reached, then each of the interface variants can be intelligently tested against the control interface, according to some aspects described herein.

Once the threshold data collection has been reached for all interface variants, a testing system may generate an uplift value for each interface variant based on the data collected thus far. In some implementations, the uplift value may be calculated based on a difference between the measured metric that is being tracked for each interface variant and the control interface. For example, the uplift value may represent the difference in the conversion rate experienced during a period of time for each interface variant as compared to the control interface.

To illustrate and only as a non-limiting example, assume there is a set of three interface variants of a control interface, variant A, variant B, and variant C. Further, assume that the tracked metric for variant A was 14% during a 24-hour period, the tracked metric for variant B was 3% during the same period, the tracked metric for variant C was 21% during that same period, and the tracked metric for the control interface was 12% during that same period. In this example, the uplift value may be the difference in the tracked metric between each interface variant and the control interface; specifically, an uplift value of +2% for variant A, an uplift value of −9% for variant B, and an uplift value of +9% for variant C. The uplift value may not be calculated for the control interface because the control interface may be the floor reference point of the uplift calculation.

In some implementations, the server may automatically select a subset of the set of interface variants for intelligently testing against the control interface. For example, the server may select only those interface variants for which a positive uplift value was calculated. Continuing with the illustrative example above, the server may select the subset of variant A and variant C to test against the control interface. The testing system would not select variant B for testing because variant B was associated with a negative uplift value. If, however, all variants are associated with a negative uplift value, then other techniques may be used to allocate portions of the network traffic to the control interface and each of the subset of interface variants (e.g., a majority of the traffic may be routed to the control interface, and smaller portions may be evenly split across the remaining interface variants). As a non-limiting example, if the uplift value of each interface variant is a negative value, then the server may automatically determine a percentage of network traffic (e.g., a weighting) to distribute to each variant and the control interface. The performances and standardized deviations of interface variants and the control interface may be used to determine the distribution of network traffic in this example.

Certain aspects and features of the present disclosure may intelligently distribute network traffic to the selected subset of interface variants (for which a positive uplift value was calculated) against the control interface, such that the selection of interface variants is performed in a manner that biases network traffic towards the best-performing interface variant (as compared to the control interface) to facilitate achieving statistical significance. Intelligently testing the subset of interface variants against the control interface, as described in certain aspects and features of the present disclosure, may include generating a selection metric for each interface variant of the subset of interface variants. For each interface variant of the subset of interface variants, the server may calculate the selection metric based on the performance of the interface variant multiplied by an uncertainty value that measures the uncertainty associated with the sample size of the data collected (e.g., thus far since the minimum threshold was satisfied) for that interface variant. The performance of each interface variant may be determined by subtracting the measured metric determined for the control interface from the measured metric determined for the interface variant (e.g., conversion rate of the interface variant minus the conversion rate of the control interface). Further, the uncertainty value may represent a sum of the variance of the data collected from interactions between website visitors and the interface variant and the variance of the data collected from interactions between website visitors and the control interface. The uncertainty value diminishes in value as additional data is collected, and thus, an interface variant performing at a high level may overcome the diminishing value of the uncertainty value in order to be selected at each period of testing (e.g., daily).

Certain aspects and features of the present disclosure relate to intelligently and periodically selecting at least one interface variant from the subset of interface variants to test against the control interface. At each selection instance (e.g., once daily), an interface variant may be intelligently selected to test against the control interface. In some implementations, determining which interface variant to select from the subset of interface variants may be based on one or more artificial intelligence techniques (e.g., a multi-armed bandit selection algorithm). For example, the server may select the interface variant associated with the highest (in terms of value) selection metric from amongst the subset of interface variants. That is, the selection metric generated for an interface variant may be compared against the remaining selection metrics for the remaining interface variants of the subset. The interface variant associated with the highest-valued selection metric may be selected as the interface variant to test against the control interface at a given selection instance (e.g., once a day) for a testing period (e.g., 24 hours).

To illustrate the uncertainty described above and the selection, and only as a non-limiting example, two interface variants may have the same selection metric value which is the highest amongst the remaining selection metrics that were generated. In this case, one of the two interface variants may be randomly selected for testing against the control interface. On the next selection instance (e.g., the next day), the selected interface variant may be tested against the control interface by allocating 50% of network traffic to the selected interface variant and the remaining 50% of the network traffic to the control interface for 24 hours. At the end of this period, the selection metric is recalculated for the interface variant that was tested. Assuming the performance value of the selected interface variant did not change during the testing period, the uncertainty value would have decreased. For instance, the sum of the variances (e.g., variance of the sample mean) associated with the selected interface variant and the control interface would have decreased because additional data was collected during the testing period. As more data is collected in the sample (e.g., website interactions between user devices and the interface variant), the variance of the sample decreases. Thus, when the selection metric is recalculated for the selected interface variant, the new selection metric will be lower than before the testing period. In this case, the original interface variant that was not previously selected would now have a higher selection metric than the interface metric that was selected, and thus, at the next selection instance, the original interface variant that was not selected would now be selected for testing against the control interface for a 24-hour period.

In some implementations, after the interface variant is intelligently selected, the network traffic may be biased towards the selected interface variant for a time period (e.g., for 24 hours). For example, biasing the network traffic towards the selected variant may include allocating a portion of the network traffic to be routed to the selected interface variant and the remaining portion may be routed to the control interface for a defined period of time (e.g., a 50-50 split of website visitor traffic between the selected interface variant and the control interface for 24 hours, 49% allocated to the selected interface variant and 49% allocated to the control interface with the remaining 2% split between remaining interface variants, and other suitable distributions). When network traffic is routed to the selected interface variant, one or more measured metrics may be collected from interactions between browsers (e.g., running on computers operated by the website visitors) and the selected interface variant. The same or similar measured metrics may be collected (e.g., by a web server) when browsers interact with the control interface. Non-limiting examples of the one or more measured metrics may include a conversion rate, percentage of sign-ups, time spent on an interface variant, time spent from first exposure to completion of an interaction (e.g., a purchase), percentage of visitor browsers that completed the interaction, and other suitable metrics. In some implementations, the one or more tracked metrics may include a combinatorial metric, which is calculated from a combination of two or more measured metrics. For example, the values of each of two measured metrics may be combined (e.g., averaged, weighted, multiplied, subtracted, or any other suitable combination) to generate a single value representing the combinatorial metric.

The intelligent distribution of network traffic to interface variants and periodic selection of the interface variant with the highest selection metric value may enhance the speed at which the best performing interface variant reaches statistical significance. The best performing interface variant may be associated with the largest difference in the tracked measured metric over the tracked measured metric associated with the control interface, which may be large enough to outweigh the diminishing value of the uncertainty value (e.g., which may be multiplied by the performance to generate the selection metric). In some implementations, when the sample size of the data collected with respect to an interface variant reaches statistical significance, the causation predicted by the tracked measured metric may be presented on the user interface as an alert for the user. For example, the causation predicted may be that the interface variant is predicted to result in an improved conversion rate over the control interface based on the collected data. As another example, the causation predicated may be that the interface variant is predicted to result in a reduced conversion rate as compared to the control interface based on the collected data. Either way, once statistical significance is reached, then the interface variant may be removed from the subset of interface variants, and the intelligent testing may continue to assist the remaining interface variants in reaching statistical significance using the aspects described herein.

In some implementations, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including identifying a control interface representing a control version of a user interface. The computer-implemented method also includes identifying one or more interface variants, each interface variant of the one or more interface variants representing an alternative version of the control interface; allocating network traffic to the control interface and each interface variant of the one or more interface variants (e.g., this can be a uniform allocation of traffic to each variant or any distribution of traffic to each variant); collecting, for the control interface and each interface variant of the one or more interface variants, metric data representing one or more measured metrics, each measured metric of the one or more measured metrics measuring at least one aspect of an interaction between a visitor browser and either an interface variant of the one or more interface variants or the control interface (e.g., time spent on an interface variant); determining that a size of the collected metric data for each interface variant of the one or more interface variants has reached a minimum threshold; in response to determining that the size of the collected metric data has reached the minimum threshold, executing a variant selection protocol, the execution of the variant selection protocol being iteratively performed (e.g., performed daily, in that each day a variant is selected for AB testing against the control interface based on the previous day's performance, the same or different variants can be selected over sequential days) and including: calculating a selection metric for each interface variant of the one or more interface variants (e.g., the intermediate metric calculated for each variant, based on which a variant is selected daily), the selection metric characterizing a difference between the one or more measured metrics calculated for the interface variant and the one or more measured metrics calculated for the control interface (e.g., a difference between the tracked metric of the interface variant and a tracked metric of the control interface), and the selection metric including an uncertainty value which decreases as additional metric data is collected (e.g., the uncertainty value may be the square root of the sum of variances for the interface variant and the control interface, and the variance reduces as more data is collected); automatically selecting one of the interface variants from the one or more interface variants, the selection metric being used to determine which interface variant to select from the one or more interface variants (e.g., the variant with the highest selection metric is selected); reallocating the network traffic to each of the selected interface variant and the control interface (e.g., a 50-50 split between the selected variant on the control, or multiple tiers of traffic allocation, such as 49% allocated to the selected variant, 49% allocated to the control interface, and the remaining 2% allocated to remaining variants). The computer-implemented method also includes collecting metric data for each of the selected interface variant and the control interface; and determining a performance associated with each of the selected interface variant and the control interface, the performance being based at least in part on the collected metric data and a recalculation of the selection metric for each of the selected interface variant and the control interface (e.g., after a day of data collection of the selected variant, the selection metric is recalculated with the new uncertainty value, which is lower now due to the additional data collected). The computer-implemented method also includes completing the variant selection protocol in response to any interface variant of the one or more interface variants being associated with a determined performance that reached statistical significance (e.g., 95% confidence level). Other embodiments of this aspect include corresponding computer systems, apparatus, and computer programs recorded on one or more computer storage devices, each configured to perform the actions of the methods.

Implementations may include one or more of the following features. The computer-implemented method where the one or more measured metrics includes a combinatorial metric representing a combination of two or more measured metrics (e.g., a combination of two or more tracked metrics). The computer-implemented method further including determining an uplift value for each interface variant of the one or more interface variants, the uplift value being calculated based on a difference between a measured metric calculated for the interface variant and the measured metric calculated for the control interface (e.g., the uplift can be the difference in the tracked metric between an interface variant and the control interface); and executing the variant selection protocol only for interface variants for which the uplift value is positive (e.g., indicating that the interface variant performed better than the control interface with respect to the measured metric). The computer-implemented method where the selection metric is calculated by computing the difference between the one or more measured metrics calculated for the interface variant (e.g., the tracked metric of the interface variant) and the one or more measured metrics calculated for the control interface (e.g., the tracked metric of the control interface), multiplied by the uncertainty value, where the uncertainty value is determined based on a sum of a first variance of the one or more measured metrics calculated for the interface variant and a second variance of the one or more measured metrics calculated for the control interface. The computer-implemented method further including generating a reporting interface (e.g., a performance report) for displaying a status of each interface variant of the one or more interface variants, the status representing whether or not the determined performance of the interface variant has reached statistical significance. The computer-implemented method where the reporting interface depicts a plurality of objects (e.g., a widget displayed as a card on the performance report), and one of the plurality of objects displays the status of each interface variant of the one or more interface variants. The computer-implemented method further including: determining that a particular interface variant has reached statistical significance; determining that the particular interface variant performed worse than the control interface with respect to the one or more measured metrics; generating a notification indicating that the particular interface variant has performed worse than the control interface with respect to the one or more measured metrics. The computer-implemented method may also include displaying the notification on a reporting interface. Implementations of the described techniques may include hardware, a method or process, or computer software on a computer-accessible medium.

In some implementations, a computer-program product tangibly embodied in a non-transitory machine-readable storage medium may be provided. The non-transitory machine-readable storage medium may include instructions configured to cause a processing apparatus to perform operations including the method(s) described above and herein. In some implementations, a system may be provided. The system may include one or more data processors. The system may also include a non-transitory computer-readable storage medium containing instructions which, when executed on the one or more data processors, cause the one or more data processors to perform operations including the method(s) described above and herein.

As a technical advantage, according to certain embodiments, multivariate testing may be performed on multiple interface variants in a manner that intelligently distributes network traffic towards the best performing interface variant (as compared to the control interface). By intelligently allocating the network traffic to the best performing variant, the sample size of well-performing interface variances may reach statistical significance quicker and more efficiently, which solves the technical challenge of time-consuming standard multivariate tests. Further, as a technical advantage, an interface variant is selected from multiple variants periodically (e.g., once daily), such that the variant that is selected is the one with the highest selection metric. This process speeds up the time it takes to reach statistical significance, which reduces the computational burdens on network resources. Additionally, the manner in which the selection metric is calculated, and how the selection metric is used to determine which interface variant to select is a benefit of using the embodiments described herein. As yet another advantage, the uncertainty values drive the selection of the interface variant. That is, a variant is determined to be better than a control if the performance of the variant can overcome this uncertainty value.

BRIEF DESCRIPTION OF THE DRAWINGS

The specification makes reference to the following appended figures, in which use of like reference numerals in different figures is intended to illustrate like or analogous components.

DETAILED DESCRIPTION

Certain embodiments of the present disclosure relate to techniques for enhancing multivariate testing by intelligently distributing network traffic across interface variants to reduce the amount of time taken for the sample sizes of best-performing interface variants to reach statistical significance. Further, certain embodiments relate to techniques for intelligently selecting interface variants to test against a control interface in a manner that reduces the uncertainty of sample sizes (e.g., the variance of the sample mean) to reach statistical significance. Techniques may include adjusting the network traffic distribution to each interface variant at regular or irregular time interfaces under certain conditions.

Figure 1:
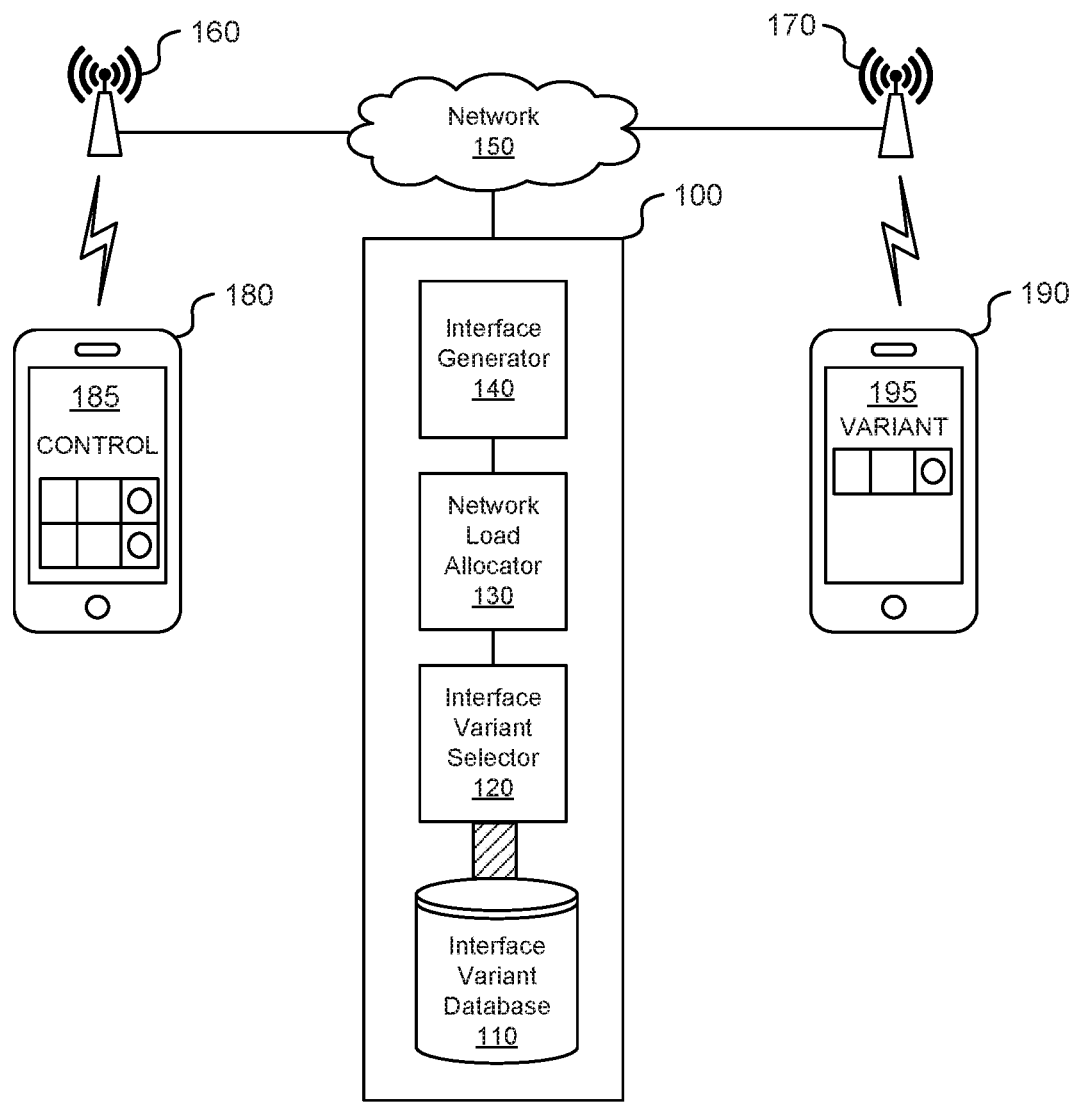
FIG. 1 is a block diagram illustrating an example network environment, according to some aspects of the present disclosure.

FIG. 1 is a block diagram illustrating an example of a network environment including testing system 100. Testing system 100 may be used to enhance the speed and accuracy of multivariate testing of interfaces, according to some aspects of the present disclosure. In some implementations, testing system 100 may include at least interface variant database 110, interface variant selector 120, network load allocator 130, and interface generator 140. Testing system 100 may be configured to communicate with user devices 180 and 190 (over a wired or wireless connection). While user devices 180 and 190 are illustrated as being mobile phones (e.g., smartphones), it will be appreciated that user devices 180 and 190 may be any portable (e.g., laptop, tablet computer, etc.) or non-portable (e.g., desktop computer, electronic kiosk, etc.) computing device. It will also be appreciated that any number of user devices may communicate with testing system 100. User devices 180 and 190 may connect to testing system 100 using network 150 (e.g., any public or private network, such as the Internet) and gateways 160 and 170 (respectively). During a multivariate test, user device 180 may be served with control interface 185 and user device 190 may be served with interface variant 195. Testing system 100 may include one or more servers configured to store and execute executable code that, when executed, causes certain methods or processes described herein to be performed.

Interface variant database 110 may be a database (e.g., a directory, a data storage device, a data structure stored in a memory, and so on) that is configured to store interface data representing the available interface variants. For example, the interface data stored in interface variant database 110 may include any web-based code that, when executed or run on a browser or Operating System, causes an interface to be presented on the screen of a user device (e.g., a computer). Any number of interface variants may be stored at interface variant database 110. Further, an interface variant may be different from a control interface in some aspect (e.g., the interface variant includes a banner and the control interface does not, the interface variant presents a button in a different color than the corresponding button presented on the control interface, or the interface variant presents different text than the control interface, etc.). Any interface variant may be selected to be the control interface. The control interface may be any interface against which an interface variant is tested during multivariate testing.

In some implementations, interface variant selector 120 may include a processor configured to execute executable code, which when executed by the processor, runs an interface variant selection protocol. For example, the interface variant selection protocol is a workflow that is executed at one or more stages to determine which interface variant to select from amongst a set of interface variants at every regular or irregular time interval. The selected interface variant is then compared against a control interface during multivariate testing. The interface selection protocol is described in greater detail with respect to FIG. 2.

In some implementations, the executing the interface variant selection protocol may include executing one or more trained machine-learning models to intelligently select one of the interface variants to test against the control interface. As a non-limiting example, interface variant selector 120 may be configured to execute a multi-armed bandit model trained to intelligently select an interface variant from amongst the set of available interface variants. The multi-armed bandit model may select an interface variant and then observe a reward associated with the selected interface variant. The reward may be "1" if the number of interactions between the selected interface variant and user devices meets or exceeds a threshold value, and "0" if the number of interactions with the selected interface variant is lower than the threshold value. At the next round of selecting an interface variant, the selection may be performed by the multi-armed bandit model based on the rewards associated with the set of interface variants. The multi-armed bandit model may select the interface variant with the highest reward (e.g., which correlates to the best performance) as the best performing interface variant. At a probability of an "epsilon" value, the multi-armed bandit model may explore other interface variants to determine if any of the other interface variants perform better than the best performing interface variant at that given time. After the multi-armed bandit model selects an interface variant through exploration, the multi-armed bandit model may detect the reward signal associated with the newly-selected interface variant.

In some implementations, interface variant selector 120 may be configured to generate a selection metric for each interface variant that is eligible for testing (e.g., for which a positive uplift value has been calculated) to determine which interface variant to select. The selection metric may be calculated based on the performance of the interface variant multiplied by the uncertainty (e.g., variance) of the sample size corresponding to the interface variant. As a non-limiting example, the selection metric may be generated by calculating the aggregate tracked measured metric value (e.g., the conversion rate since the interface variant was introduced to website visitors for testing) of an interface variant minus the aggregate tracked measured metric value of the control interface, plus a constant (e.g., associated with a certain level of uncertainty of the collected sample), and multiplied by the square root over the sum of the variances of the interface variant and the control interface. In some implementations, the aggregate tracked measured metric value for the interface variant may be matched in time to the aggregate tracked measured metric value for the control interface. For example, if the aggregate tracked measured metric for the interface variant is collected for Friday, Saturday, and Sunday of a given week, the aggregate tracked measured metric for the control interface, which is compared against the interface value, may also only be collected for Friday, Saturday, and Sunday of that same week. The interface variant selector 120 may be configured to select the interface variant that has the highest selection metric value of all interface values. If the highest selection metric value is shared between multiple interface variants, then one of those multiple interface variants may be selected for testing against the control interface (e.g., randomly). In some implementations, network load allocator 130 may include a processor configured to execute executable code, which when executed, causes network traffic (e.g., a network load of website visitors) to be routed to one or more interface variants and/or the control interface. In some implementations, after an interface variant has been selected by the interface variant selector 120, network load allocator 130 may split the network traffic between the selected interface variant and the control interface. For example, the interface variant selected for testing against the control interface may receive 50% of the network traffic and the control interface may receive the remaining 50%. As another example, the network traffic may be split between the interface variant and the control interface in large part, but small remaining portion of the network traffic may be allocated to other interface variants (e.g., 49% allocated to the interface variant and 49% allocated to the control interface with the remaining 2% allocated to one or more remaining interface variants). The network load allocator 130 may allocate network traffic to the selected interface variant and the control interface for a testing period (e.g., for 24 hours), until the next selection instance, at which time another or the same interface variant is selected for testing against the control interface.

Interface generator 140 may distribute the interface variant 195 or the control interface 185 to browsers operated by website visitors according to the network traffic split distributed by network load allocator 130. For example, interface generator 140 may serve the control interface 185 to user device 180, whereas, the interface generator 140 may serve the interface variant 195 to user device 190, in accordance with the determined traffic distribution.

Figure 2:
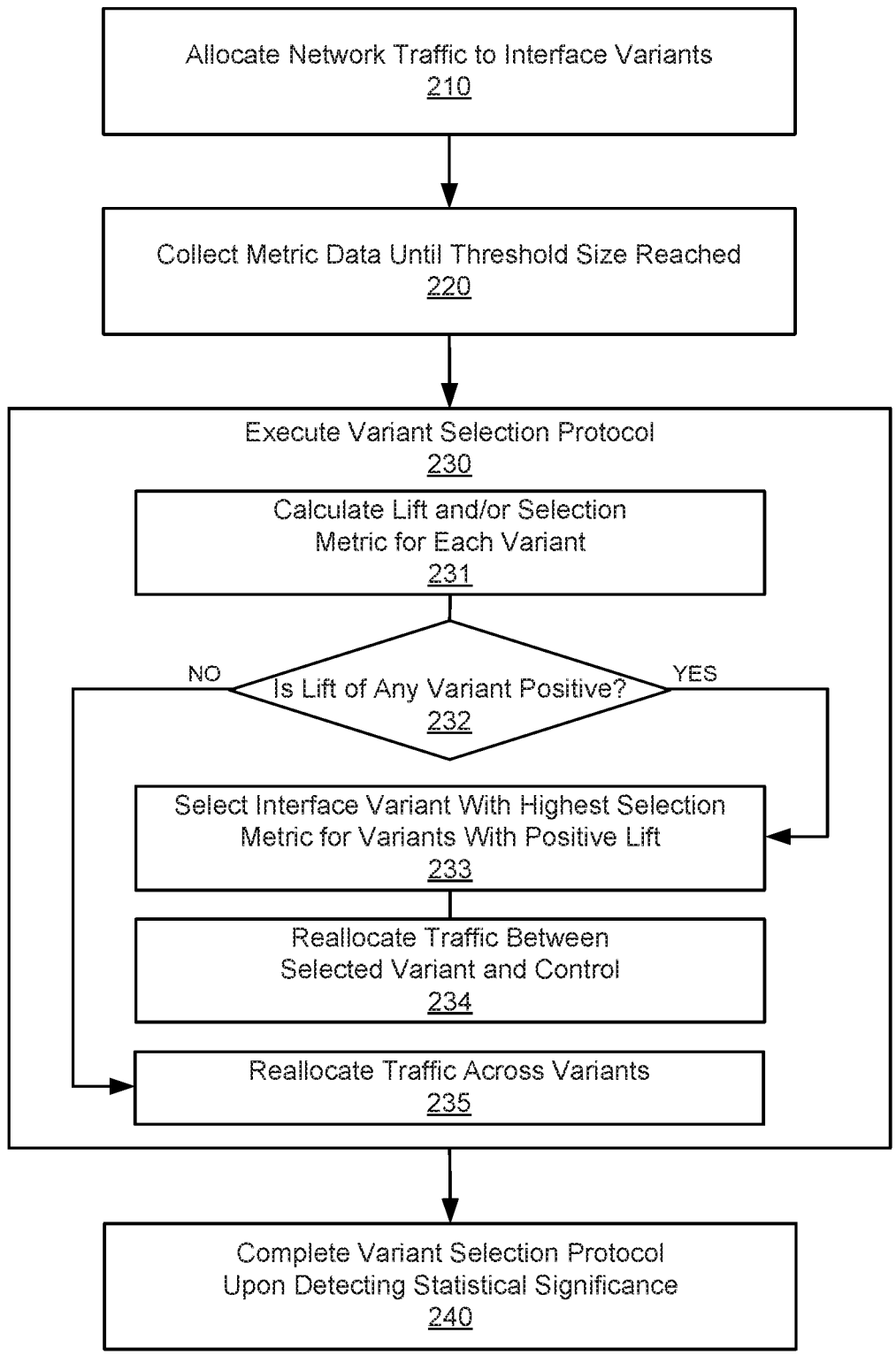
FIG. 2 is a flowchart illustrating an example of a process for automatically allocating network traffic to interface variants, according to some aspects of the present disclosure.

FIG. 2 is a flowchart illustrating an example of a process 200 for automatically distributing network traffic to interface variants according to some aspects of the present disclosure. Process 200 may be performed at least in part by any of the components described in the Figures herein, for example, by any component of testing system 100 or by testing system 100 itself. Further, process 200 may be performed to intelligently select an interface variant from amongst a set of interface variants, based on a selection metric tracked for each of the selected interface variant and the control interface.

Process 200 may begin at block 210, where the network traffic during the testing period (e.g., 24 hours) is distributed across all interface variants and the control interface. In some implementations, the network traffic is initially distributed uniformly across the interface variants and the control interface. In other implementations, the network traffic is initially distributed non-uniformly to the interface variants and the control interface. Initially allocating a portion of network traffic to each interface variant ensures that each interface variant has received at least a minimum amount of network traffic, including a minimum amount of interactions between user devices and the interface variant or the control interface (e.g., 100 interactions between various user devices an each interface variant). For example, the minimum amount of traffic may be any threshold value. In some implementations, the testing system may assign the weight of n to each of interface variants (including the control variant) in the test, where n is the number of alternative variants. The weight assigned to an interface variant or a control interface may represent the percentage of total network traffic that is routed to the interface variant. In some implementations, the minimum amount of network traffic that each interface variant may receive before intelligent testing can be performed may be a quantity equal to the conversion rate multiplied by one minus the conversion rate, and the resulting value may be divided by the total number of visitors exposed to the interface variant.

At block 220, the testing system may collect metric data from each of the interface variants so as to build a minimum sample size (e.g., the minimum number of website visitors or the minimum number of interactions performed by website visitors) of collected data for each interface variant. For example, the metric data may represent one or more measured metrics that can be measured by a browser or web server. The measured metric that is collected may be set by a user viewing a user interface that facilitates the enhanced multivariate testing, described herein with respect to certain embodiments.

In some implementations, the minimum sample size collected for each interface variant may be defined in terms of the number of website visitors that visited that interface variant (e.g., each interface variant is served to at least 100 website visitors) during a time period (e.g., 24 hours). In some implementations, the minimum sample size may be defined in terms of the number of interactions performed by the website visitors during the time period. As a non-limiting example, for the tracked metric of conversion rate, the minimum sample size for each interface variant may be at least 50 conversions (e.g., where a website visitor purchases a product) during the time period. In some implementations, an upper bound may also be defined in addition to the minimum sample size, such as no more than 90 conversions during the time period.

In some implementations, the measured metric may be a combination of measurable metrics (e.g., a combinatorial metric). For example, the combinatorial metric may combine two or more different measured metrics into a single value. The combination of different measured metrics may include, for example, a weighted average, an average, or any weighted combination of measured metrics into a single value. In some implementations, the user may navigate the user interface to set a formula for combining the measured metrics (e.g., track website visitors who stay on the website for 5 minutes or less, track website visitors who signed up for a platform and the revenue did not decrease, and so on). As another example, the user interface may present one or more pre-saved settings or formulas that may include a threshold (e.g., viewing the website for less than 5 minutes), a restriction (e.g., no tracking the metric if it caused the revenue to drop), or a combination of one or more measured metrics. The user may then reassign parts of a data flow as input into the one or more pre-saved settings or formulas (e.g., a pre-saved combinatorial metric that tracks events that caused an increase in visitors while not harming revenue, and also did not increase the website visitor's time on the website disproportionately). It will be appreciated that the measured metrics may include a restrictive metric and a permissive metric (e.g., potentially selectable or toggled using a checkbox displayed on the user interface). For example, the restrictive metric may be strictly enforced (e.g., a new variant cannot cause a decrease in revenue), whereas, a permissive metric may be a sliding scale that is proportional to a primary metric (e.g., if a revenue drop a percentage point, that is acceptable, however, if the drop becomes more significant, then track that metric). It will also be appreciated that measured metrics may be normalized. For example, for a conversion rate, a website visitor may ultimate purchase a product a few days after first being exposed to an interface variant. Thus, the conversion rate may be normalized to include subsequent events that do not occur during a single browsing session (e.g., so as to include the purchase into the conversion rate even though the purchase occurred days after the first exposure to the interface variant). It will also be appreciated that the measured metric can be changed by the user during a testing period. The data being collected is not only for the measured metric that the user has indicated he or she would like to track. All relevant metrics may be constantly tracked, and thus, if a wants to switch from one metric to another, all the data collected for the both metrics are available.

At block 230, after the minimum sample size threshold has been satisfied, the testing system may execute an interface variant selection protocol to intelligently select an interface variant for testing against the control interface so as to facilitate achieving statistical significance for the selected variant. Executing the interface variant selection protocol may be iteratively performed at a given time for every testing period (e.g., once every 24 hours). For example, an interface variant may be selected and tested against the control interface on a regular or irregular testing interval (e.g., daily, every week, any day once a week, and so on). As another example, each day, a variant may selected for AB testing against the control interface based on the previous day's performance (e.g., the previous day's selection metric values). The same or different variants can be selected over sequential days. If one interface variant is performing at or above a threshold (e.g., in terms of the tracked metric of that interface variant), then the interface variant may be selected at each selection instance, as long as that interface variant corresponds to the highest selection metric value as compared to the selection metric of remaining interface variants.

At block 231, the testing system may generate an uplift (also referred to as lift) and a selection metric for each interface variant of the one or more interface variants during a testing time period. For example, an interface variant may be selected for testing against the control interface, such that the selection of the interface variant from the set of interface variants is based on the generated selection metric.

In some implementations, as a non-limiting example, block 231 may include the testing system generating at least two metrics: (1) the lift $L_j = p_j - p_c$ and (2) the UCB (Upper Confidence Bound) algorithm type optimistic estimate for the variant performance, $$\delta_j = p_j - p_c + \sqrt{\frac{p_j(1-p_j)}{g_j}} \cdot \sqrt{1 + \log G},$$

where $p_j$ and $g_j$ are the measured metric (e.g., conversion rate) of variant j during the testing period and the number of visitors served with variant j (respectively), $p_c$ is the measured metric of the control variant during the testing period, and G is the total number of website visitors detected during the testing period. In some implementations, the testing system may adjust the above metrics to account for the change of traffic shares of interface variants using from a stratified sampling formula.

In some implementations, the selection metric may characterize a difference between the measured metric calculated for the interface variant and the measured metric calculated for the control interface (e.g., a difference between the conversion rate of the interface variant and a conversion rate of the control interface, such that the conversion rates are calculated based on the period of time in which the interface variant was exposed to website visitors). The selection metric may include an uncertainty value which decreases as additional metric data is collected (e.g., the uncertainty value may be the square root of the sum of variances for the interface variant and the control interface, and the variance reduces as more data is collected). The uncertainty value may be multiplied with the calculated difference in the measured metric (e.g., multiplied by the determined performance of the interface variant).

At block 232, the testing system may determine whether the lift metric generated at block 231 is a positive value for at least one interface variant. If the testing system determines that the lift metric is a positive value for at least one interface variant, then process 200 may proceed to block 233. However, if the testing system determines that the lift metric generated at block 231 is a negative or zero value for all interface variants, then process 200 proceeds to block 235.

At block 233, the testing system may automatically select one of the interface variants from the one or more interface variants based on the selection metrics of the one or more interface variants. The selection metric may be used to determine which interface variant to select from the one or more interface variants (e.g., the variant with the highest selection metric is selected for testing against the control interface). For example, the testing system may select the interface variant with the highest $\delta_j$ (calculated at block 231) from amongst the $\delta_j$ values calculated for the one or more interface variants. In other implementations, the interface variant may be randomly selected from the one or more interface variants. In still other implementations, one or more artificial intelligence models may be used to select the interface variant at block 233 (e.g., a multi-armed bandit selection model may be executed to select the interface variant from the available interface variants).

At block 234, the network traffic may be reallocated (from the network traffic allocation performed at block 210, or from a previous day's allocation) to each of the selected interface variant and the control interface (e.g., a 50-50 split between the selected variant on the control, or multiple tiers of traffic allocation, such as 49% allocated to the selected variant, 49% allocated to the control interface, and the remaining 2% allocated to remaining variants). In some implementations, the testing system may numerically solve a constraint optimization problem to determine the weightings (e.g., a weighting referring to a percentage of network traffic distributed to an interface variant) to be assigned to interface variants. The goal function of such problem may be based on the lifts and standardized deviations of the available interface variants and the control interface.

The testing system may collect metric data for each interface variant selected at block 233 and the control interface, and may determine a performance (e.g., j calculated at block 231) associated with each of the selected interface variant and the control interface. For example, the performance may be based at least in part on the collected metric data and a recalculation of the selection metric for each of the selected interface variant and the control interface (e.g., after a day of data collection of the selected variant, the selection metric is recalculated with the new uncertainty value, which is lower now due to the additional data collected).

If, from block 232, the process 200 proceeds to block 235, then the network traffic may be reallocated across the interface variants and the control interface. In some implementations, the network traffic may be reallocated uniformly across the interface variants and the control interface (e.g., 10% of the network traffic allocated to each of four interface variants and the control interface). In other implementations, the network traffic may be non-uniformly reallocated across the interface variants and the control interface. For example, the non-uniform allocation of network traffic may be determined as a numeric solution to a certain constraint optimization problem with the goal function based on the lifts and standardized deviations of the alternative variants and the control interface. To illustrate, the testing system can numerically solve a constraint optimization problem to determine the weightings (e.g., a weighting referring to a percentage of network traffic distributed to an interface variant) to be assigned to each interface variant and the control interface. The goal function of the constrain optimization problem can be based on the lifts and standardized deviations of the other interface variants and the control interface.

At block 240, when the sample size of the collected metrics over the testing period for the interface variant is statistically significant, the testing system may complete the interface variant selection protocol. In some implementations, the testing system may transmit a notification to a user device (e.g., operated by a user who set up the test, such as by selecting the control interface and the interface variants and initiating the testing using the testing system). After the sample size of an interface variant has reached statistical significance, then the network traffic (e.g., all of the network traffic) may be distributed to the interface variant. The interface variant may then become the control interface against with other interface variants are tested.

In some implementations, the interface variant selection protocol may be terminated in response to any interface variant of the one or more interface variants being associated with a determined performance that reached statistical significance (e.g., 95% confidence level). In some implementations, the variant selection protocol may continue to assist remaining interface variants (that have not yet reached statistical significance) in reaching statistical significance.

In some implementations, the testing system may enable the user to perform multivariate testing for interface variants targeted to one or more segments of website visitors (e.g., a segment being defined based on attributes, such as location and age). The testing may be performed with different sets of interface variants within the same multivariate test. Each interface variant may have its own control variant. Then, the different sets of interface variants may be served to each segment with respect to the control variant in the segment. As a result, the time needed to finish the test, for example, to reach a statistically significant sample size in each of segments, can be minimized.

In some implementations, a user may seek to run a multivariate test that may lead to one or more possible combinations of interface variants within each of level (e.g., element) of the multivariate test. Running such tests may impractical, however, because experiences (e.g., combinations of interface variants) may not receive sufficient network traffic. Partial factorial designs may be used to serve specific combinations of interface variants to site visitors, which significantly increases the traffic allocated per interface variants combination and allows the testing system to generate estimations of the performance of unserved variants combinations. These implementations may further reduce the duration of the test. The selected interface variant combinations of the partial-factorial test design may be served until a statistics threshold is satisfied. Then, for every combination of the interface variants, the testing system may generate the selection metric by determining the performance, $\delta_j$, for combination of interface variants that were served to website visitors or the estimated values of the performance. The combination of interface variants with the highest selection metric may be served during the next testing period.

In some implementations, multiple tests may run concurrently. The user may seek to test multiple different changes of the same interface with separate tests being executed for each type of change. The testing system may enable multiple tests to be executed concurrently. Each of the concurrent tests may be a variant of multivariate testing. Further, the performance metric for each concurrent test may be the difference between the alternative (best alternative) and the control variants within smaller tests.

Figure 3:
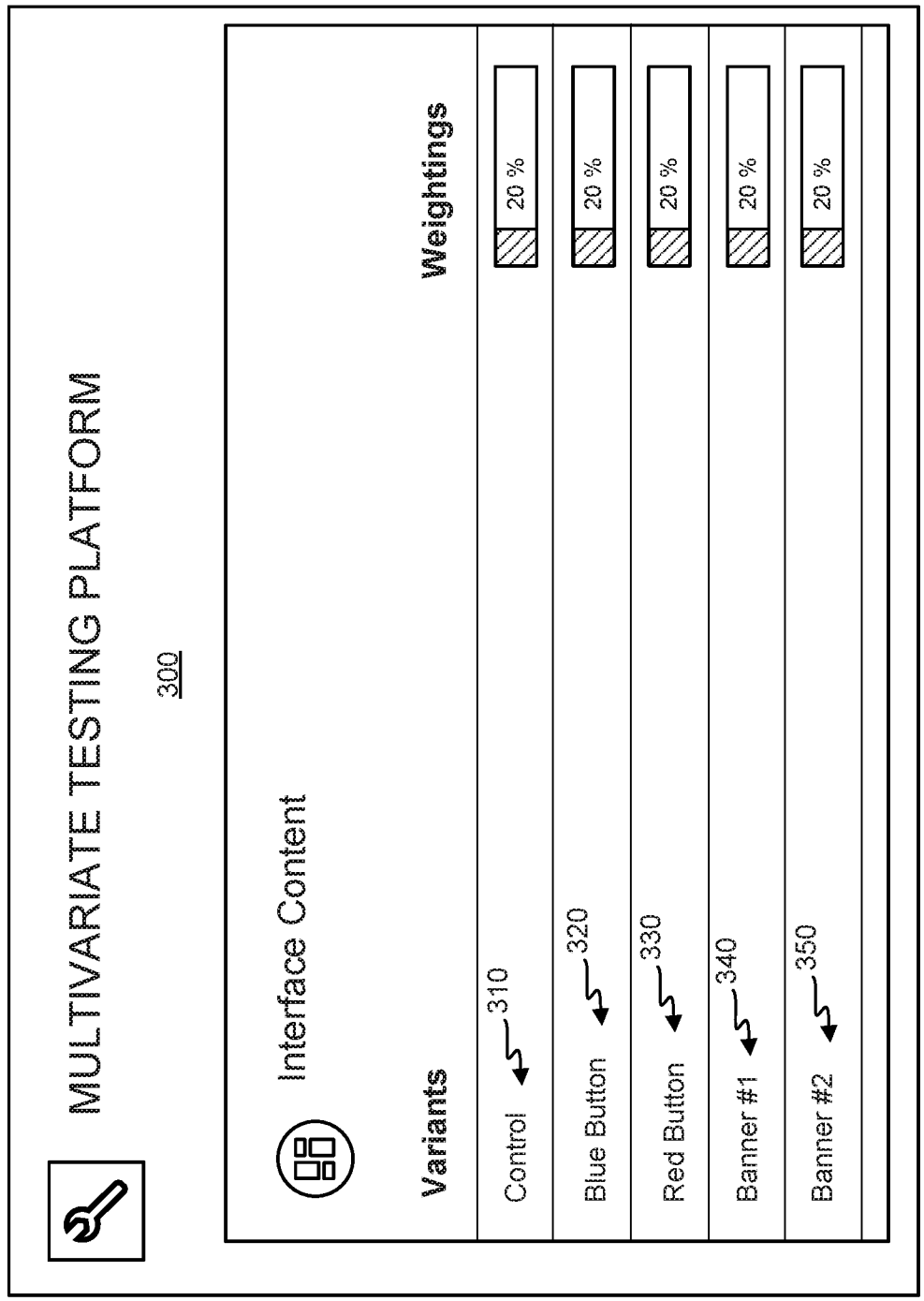
FIGS. 3-5 are examples of interfaces for presenting performance information of interface variants, according to some aspects of the present disclosure.
Figure 4:
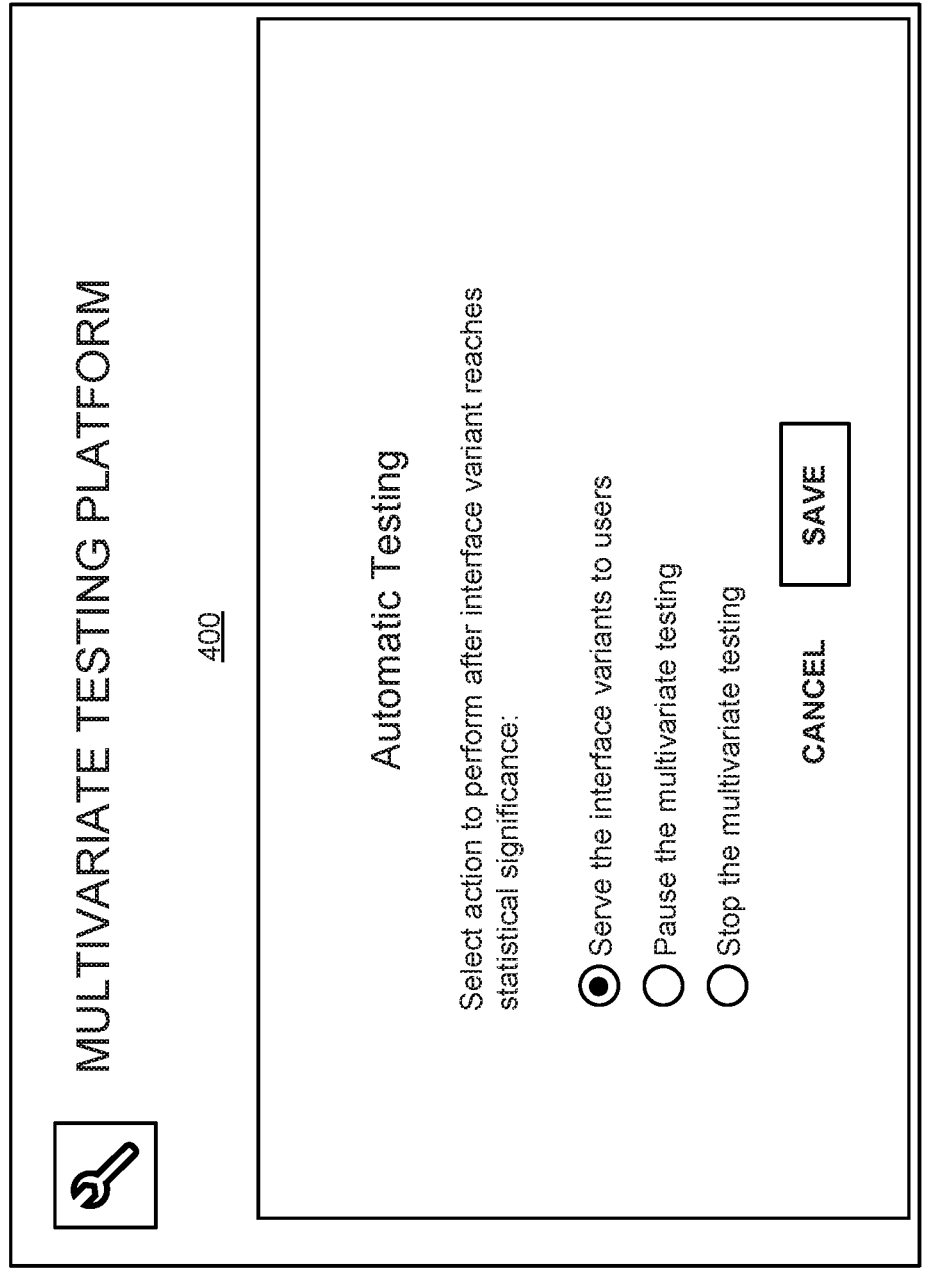
Figure 5:
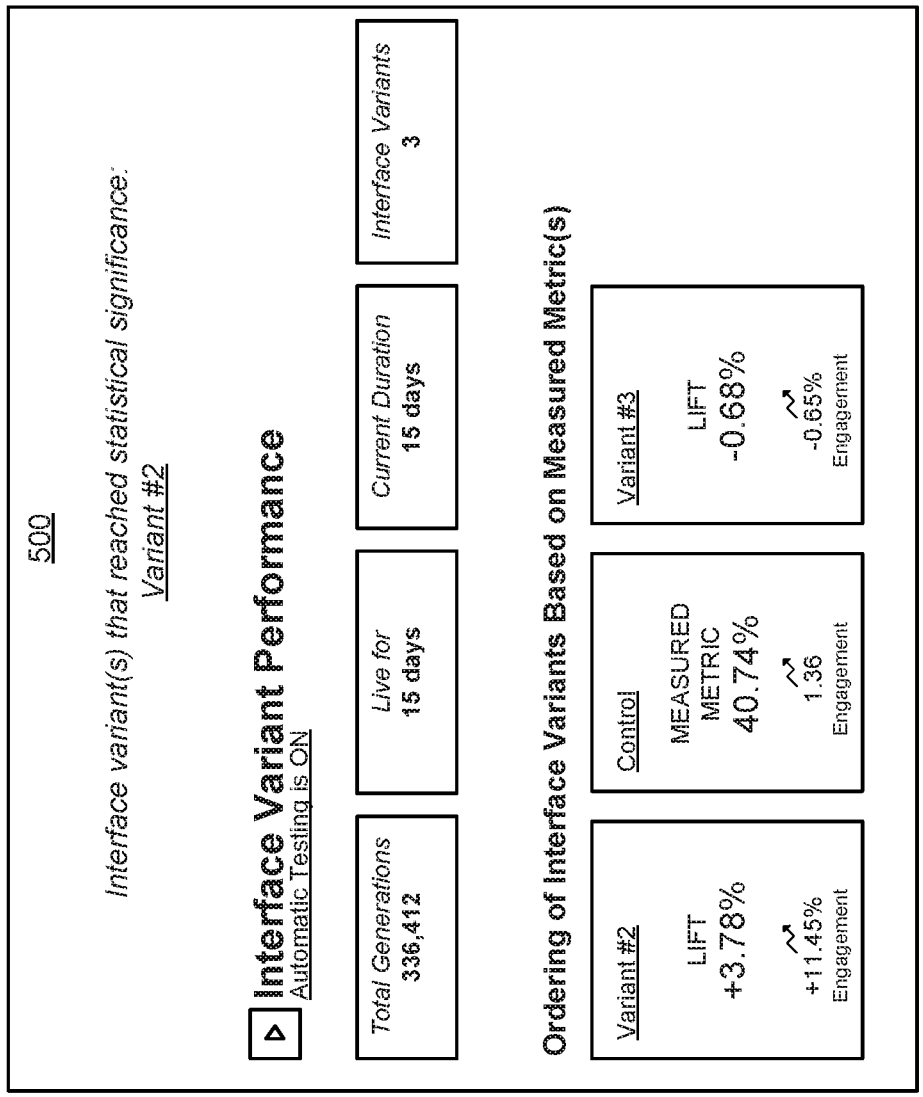

FIGS. 3-5 are examples of interfaces for presenting performance information for multivariate testing of interface variants, according to some aspects of the present disclosure. FIG. 3 is an example of an interface 300 that a user can navigate to define the interface variants, the control interface, and the weightings (e.g., the initial percentage of network traffic to be distributed to the interface) for each interface variant or for the control interface. In some examples, the weightings may be automatically determined, given that the network traffic is initially distributed uniformly across the available interface variants and the control interface. For example, interface 300 displays a listing of the control interface 310, interface variant 320 (which differs from the control interface in that the interface variant 320 includes a blue button), interface variant 330 (which differs from the control interface in that the interface variant 330 includes a red button), interface variant 340 (which differs from the control interface in that interface variant 340 includes a specific banner), and interface variant 350 (which differs from the control interface in that interface variant 350 includes a different banner).

FIG. 4 is an example of an interface 400 that enables a user to perform multivariate testing of the interface variants, according to embodiments and implementations described herein. Interface 400 may enable the user to select an action that the testing system is to perform after the sample size of an interface variant reaches statistical significance. FIG. 5 is an example of an interface that reports various details of the performance of interface variants. While not shown in interface 500, the interface may present various details about interface variants, such as how much traffic has been distributed to each variant, how successful each variant has been at impacting a measured metric, an estimated time until each variant reaches statistical significance, which variant has been shown to website visitors, how the selection metrics have changed over time, which interface variants may be excluded, which interface variants are declared as a winner, and other suitable details.

Figure 6:
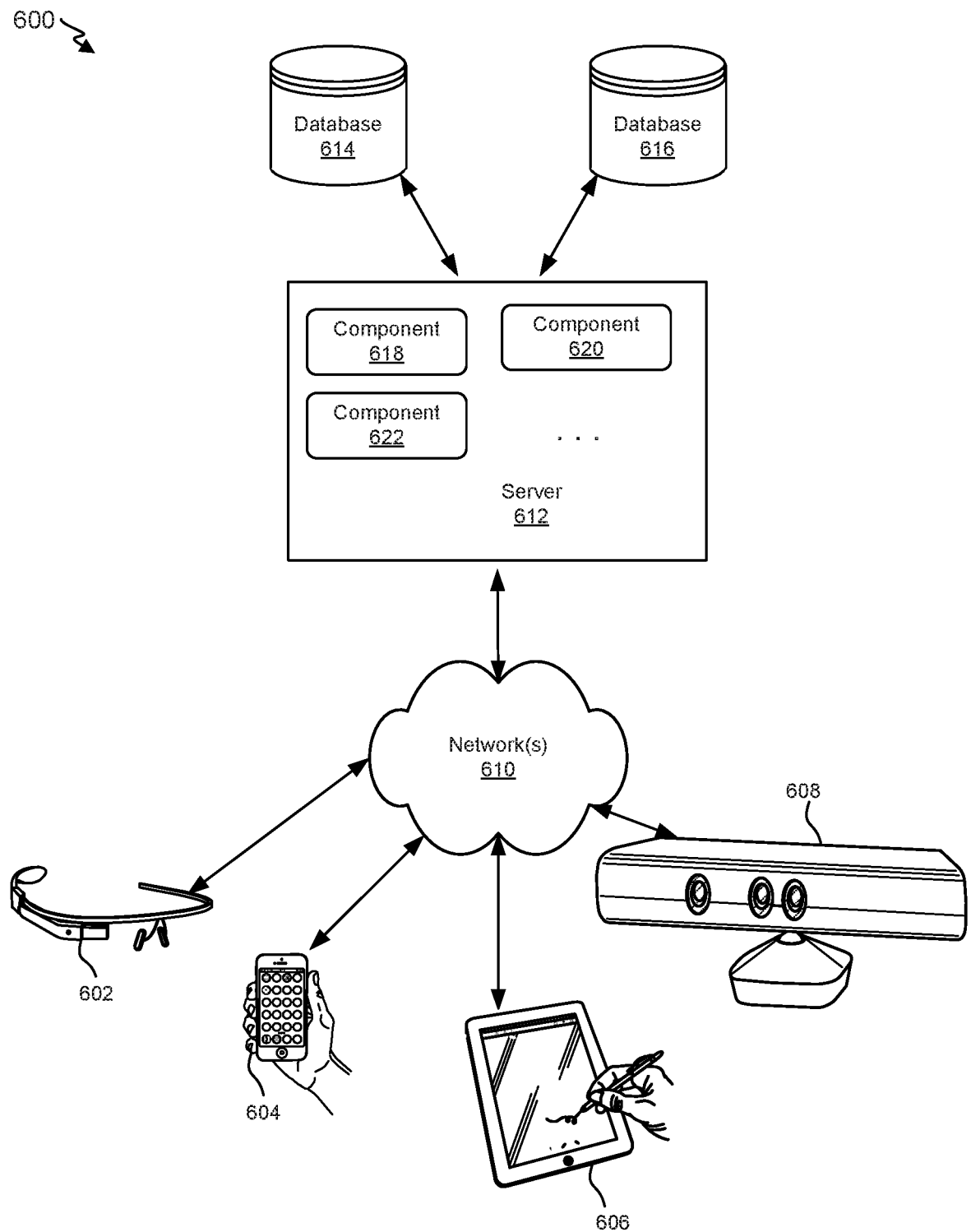
FIG. 6 is a simplified diagram illustrating a distributed system for implementing one of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange). AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers. UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers. CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
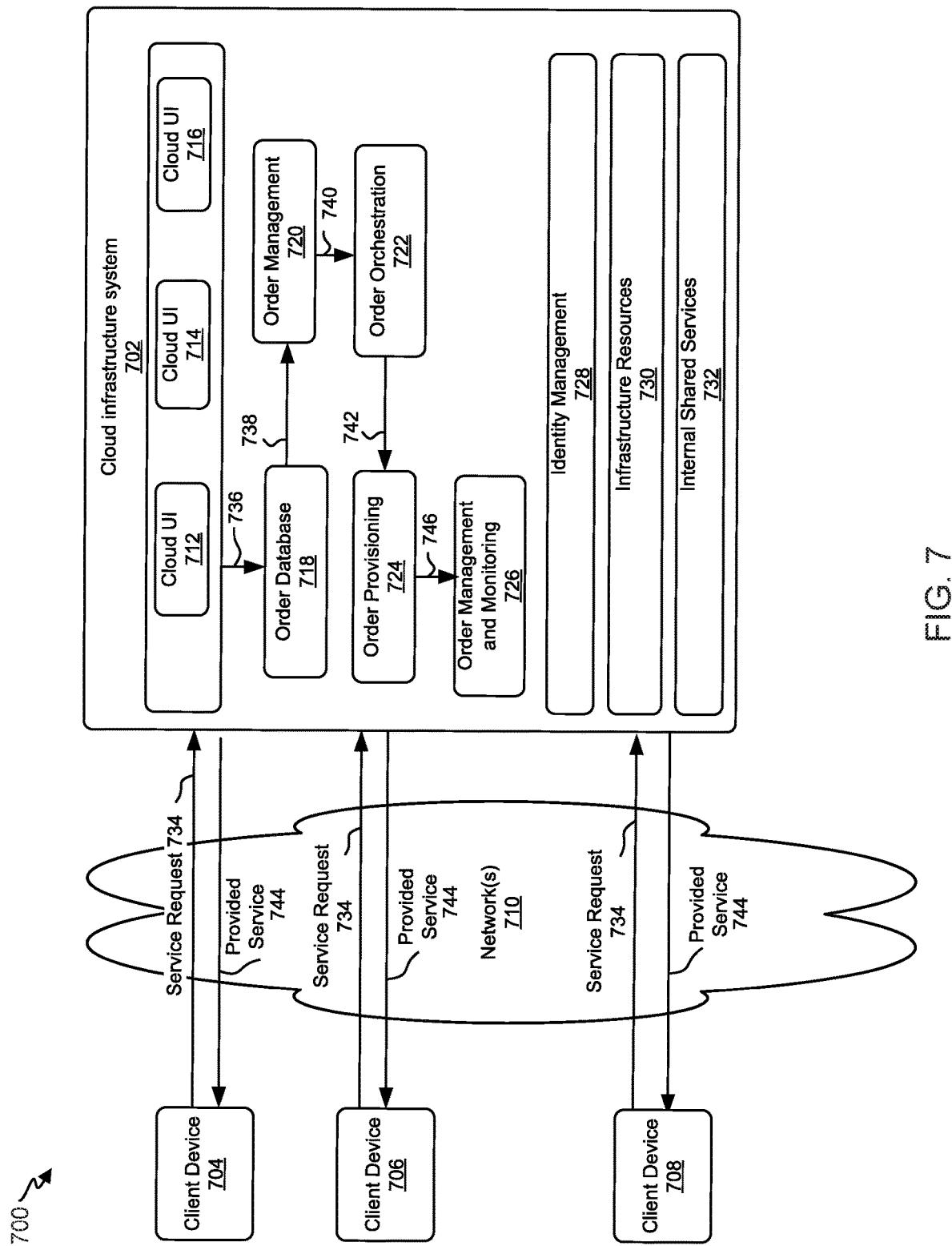
FIG. 7 is a simplified block diagram illustrating one or more components of a system environment.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 802 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of processes associated with each order and applies logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
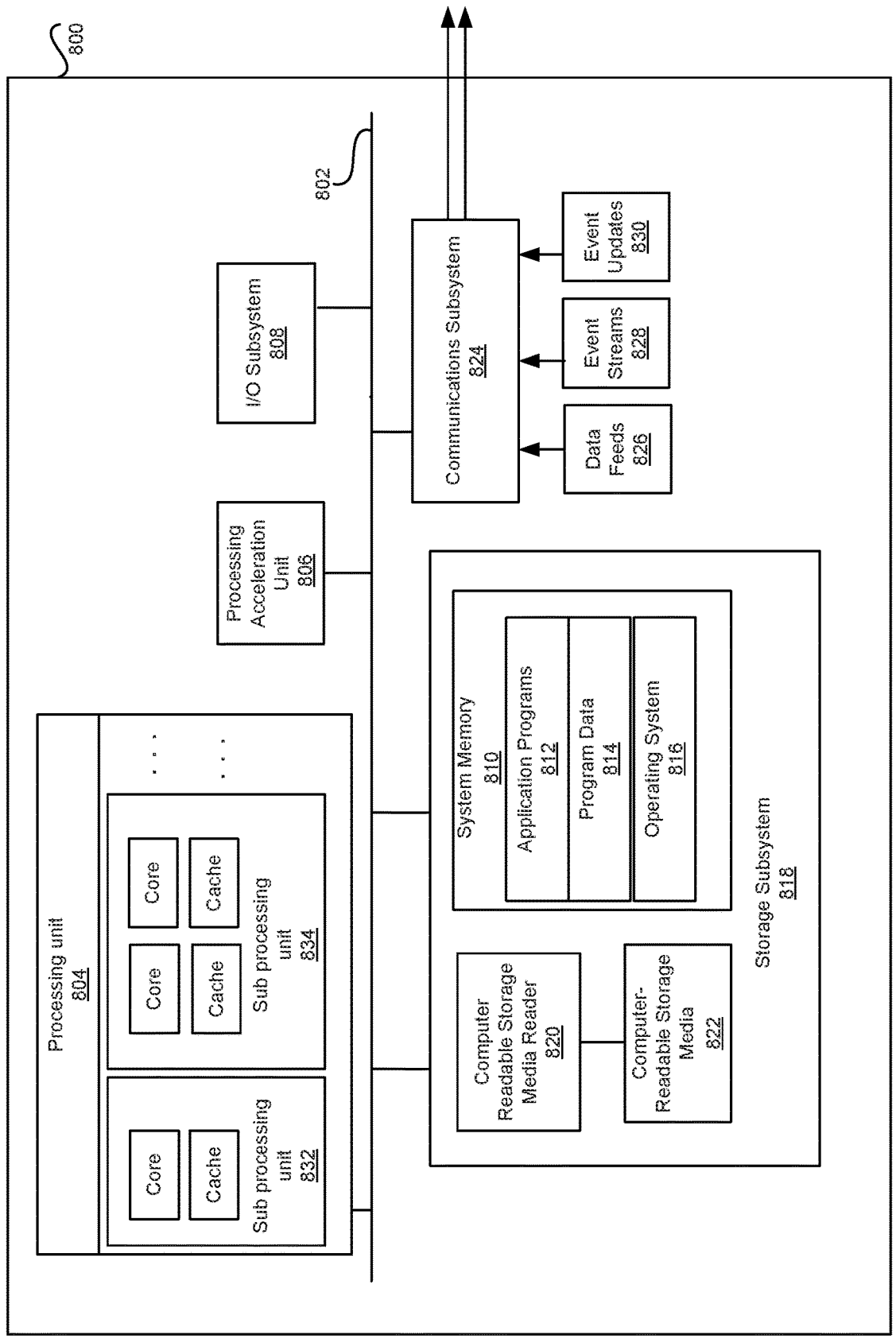
FIG. 8 illustrates an exemplary computer system, in which various embodiments of the present invention may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

IO subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®), and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology. CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD RO, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   identifying a control interface representing a control version of a user interface for multivariate testing;
   identifying one or more interface variants, each interface variant of the one or more interface variants representing an alternative version of the control interface, wherein the one or more interface variants differ from the control interface;

allocating network traffic to the control interface and each interface variant of the one or more interface variants;

collecting, for the control interface and each interface variant of the one or more interface variants, metric data representing one or more measured metrics, each measured metric of the one or more measured metrics measuring at least one aspect of an interaction between a visitor browser and either an interface variant of the one or more interface variants or the control interface;

determining that a size of the collected metric data for each interface variant of the one or more interface variants has reached a minimum threshold;

in response to determining that the size of the collected metric data has reached the minimum threshold, executing a variant selection protocol, the execution of the variant selection protocol being iteratively performed, and including:

calculating a selection metric for each interface variant of the one or more interface variants, the selection metric is calculated by computing a difference between the one or more measured metrics calculated for the selected interface variant and the one or more measured metrics calculated for the control interface, multiplied by an uncertainty value, wherein the uncertainty value is determined based on a combination of a variability metric of the one or more measured metrics calculated for the selected interface variant and a second variability metric of the one or more measured metrics calculated for the control interface;

automatically selecting one of the interface variants from the one or more interface variants, the selection metric being used to determine which interface variant to select from the one or more interface variants;

reallocating a predetermined percentage of the network traffic to each of the one or more interface variants and the control interface;

collecting metric data for each of the selected interface variant and the control interface;

determining a performance associated with each of the selected interface variant and the control interface, the performance being based at least in part on the collected metric data and a recalculation of the selection metric for each of the selected interface variant and the control interface; and completing the variant selection protocol in response to any interface variant of the one or more interface variants being associated with a determined performance that reached statistical significance.

2. The computer-implemented method of claim 1, wherein the one or more measured metrics includes a combinatorial metric representing a combination of two or more measured metrics.

3. The computer-implemented method of claim 1, further comprising:

determining an uplift value for each interface variant of the one or more interface variants, the uplift value being calculated based on a difference between a measured metric calculated for the interface variant and the measured metric calculated for the control interface; and executing the variant selection protocol only for interface variants for which the uplift value is positive.

4. The computer-implemented method of claim 1, wherein the selection metric is calculated by computing the difference between the one or more measured metrics calculated for the selected interface variant and the one or more measured metrics calculated for the control interface, multiplied by the uncertainty value, wherein the uncertainty value is determined based on a sum of a first variance of the one or more measured metrics calculated for the selected interface variant and a second variance of the one or more measured metric calculated for the control interface.

5. The computer-implemented method of claim 1, further comprising:

generating a reporting interface for displaying a status of each interface variant of the one or more interface variants, the status representing whether or not the determined performance of the selected interface variant has reached statistical significance.

6. The computer-implemented method of claim 5, wherein the reporting interface depicts a plurality of objects, and one of the plurality of objects displays the status of each interface variant of the one or more interface variants.

7. The computer-implemented method of claim 1, further comprising:

determining that a particular interface variant has reached statistical significance;

determining that the particular interface variant performed worse than the control interface with respect to the one or more measured metrics;

generating a notification indicating that the particular interface variant has performed worse than the control interface with respect to the one or more measured metrics; and displaying the notification on a reporting interface.

8. The computer-implemented method of claim 1, wherein the one or more interface variants comprise a modified versions of the control interface that comprises at least one of a different color and different text from the control interface.

9. The computer-implemented method of claim 1, wherein the reallocating the predetermined percentage of the network traffic to each of the selected interface variants and the control interface enables a server to bias the network traffic towards best-performing interface variants.

10. A non-transitory machine-readable storage medium, including instructions configured to cause a processing apparatus to perform operations including:

identifying a control interface representing a control version of a user interface for multivariate testing;

identifying one or more interface variants, each interface variant of the one or more interface variants representing an alternative version of the control interface, wherein the one or more interface variants differ from the control interface;

allocating network traffic to the control interface and each interface variant of the one or more interface variants;

collecting, for the control interface and each interface variant of the one or more interface variants, metric data representing one or more measured metrics, each measured metric of the one or more measured metrics measuring at least one aspect of an interaction between a visitor browser and either an interface variant of the one or more interface variants or the control interface;

determining that a size of the collected metric data for each interface variant of the one or more interface variants has reached a minimum threshold;

in response to determining that the size of the collected metric data has reached the minimum threshold, executing a variant selection protocol, the execution of the variant selection protocol being iteratively performed, and including:
- calculating a selection metric for each interface variant of the one or more interface variants, the selection metric is calculated by computing a difference between the one or more measured metrics calculated for the selected interface variant and the one or more measured metrics calculated for the control interface, multiplied by an uncertainty value, wherein the uncertainty value is determined based on a combination of a variability metric of the one or more measured metrics calculated for the selected interface variant and a second variability metric of the one or more measured metrics calculated for the control interface;
- automatically selecting one of the interface variants from the one or more interface variants, the selection metric being used to determine which interface variant to select from the one or more interface variants;
- reallocating a predetermined percentage of the network traffic to each of the one or more interface variants and the control interface;
- collecting metric data for each of the selected interface variant and the control interface;
- determining a performance associated with each of the selected interface variant and the control interface, the performance being based at least in part on the collected metric data and a recalculation of the selection metric for each of the selected interface variant and the control interface; and
- completing the variant selection protocol in response to any interface variant of the one or more interface variants being associated with a determined performance that reached statistical significance.

11. The non-transitory machine-readable storage medium of claim 10, wherein the one or more measured metrics includes a combinatorial metric representing a combination of two or more measured metrics.

12. The non-transitory machine-readable storage medium of claim 10, wherein the operations further comprise:
- determining an uplift value for each interface variant of the one or more interface variants, the uplift value being calculated based on a difference between a measured metric calculated for the interface variant and the measured metric calculated for the control interface; and
- executing the variant selection protocol only for interface variants for which the uplift value is positive.

13. The non-transitory machine-readable storage medium of claim 10, wherein the selection metric is calculated by computing the difference between the one or more measured metrics calculated for the selected interface variant and the one or more measured metrics calculated for the control interface, multiplied by the uncertainty value, wherein the uncertainty value is determined based on a sum of a first variance of the one or more measured metrics calculated for the selected interface variant and a second variance of the one or more measured metrics calculated for the control interface.

14. The non-transitory machine-readable storage medium of claim 10, wherein the operations further comprise:
- generating a reporting interface for displaying a status of each interface variant of the one or more interface variants, the status representing whether or not the determined performance of the selected interface variant has reached statistical significance.

15. The non-transitory machine-readable storage medium of claim 14, wherein the reporting interface depicts a plurality of objects, and one of the plurality of objects displays the status of each interface variant of the one or more interface variants.

16. The non-transitory machine-readable storage medium of claim 10, wherein the operations further comprise:
- determining that a particular interface variant has reached statistical significance;
- determining that the particular interface variant performed worse than the control interface with respect to the one or more measured metrics;
- generating a notification indicating that the particular interface variant has performed worse than the control interface with respect to the one or more measured metrics; and
- displaying the notification on a reporting interface.

17. A system, comprising:
- one or more processors; and
- a non-transitory computer-readable storage medium containing instructions which, when executed on the one or more processors, cause the one or more processors to perform operations including:
  - identifying a control interface representing a control version of a user interface for multivariate testing;
  - identifying one or more interface variants, each interface variant of the one or more interface variants representing an alternative version of the control interface, wherein the one or more interface variants differ from the control interface;
  - allocating network traffic to the control interface and each interface variant of the one or more interface variants;
  - collecting, for the control interface and each interface variant of the one or more interface variants, metric data representing one or more measured metrics, each measured metric of the one or more measured metrics measuring at least one aspect of an interaction between a visitor browser and either an interface variant of the one or more interface variants or the control interface;
  - determining that a size of the collected metric data for each interface variant of the one or more interface variants has reached a minimum threshold;
  - in response to determining that the size of the collected metric data has reached the minimum threshold, executing a variant selection protocol, the execution of the variant selection protocol being iteratively performed, and including:
    - calculating a selection metric for each interface variant of the one or more interface variants, the selection metric is calculated by computing a difference between the one or more measured metrics calculated for the selected interface variant and the one or more measured metrics calculated for the control interface, multiplied by and the selection metric including an uncertainty value, wherein the uncertainty value is determined based on a combination of a variability metric of the one or more measured metrics calculated for the selected interface variant and a second variability metric of the one or more measured metrics calculated for the control interface;
    - automatically selecting one of the interface variants from the one or more interface variants, the selection metric being used to determine which interface variant to select from the one or more interface variants;

reallocating a predetermined percentage of the network traffic to each of the one or more interface variants and the control interface;

collecting metric data for each of the selected interface variant and the control interface;

determining a performance associated with each of the selected interface variant and the control interface, the performance being based at least in part on the collected metric data and a recalculation of the selection metric for each of the selected interface variant and the control interface; and completing the variant selection protocol in response to any interface variant of the one or more interface variants being associated with a determined performance that reached statistical significance.

18. The system of claim 17, wherein the one or more measured metrics includes a combinatorial metric representing a combination of two or more measured metrics.

19. The system of claim 17, wherein the operations further comprise:

determining an uplift value for each interface variant of the one or more interface variants, the uplift value being calculated based on a difference between a measured metric calculated for the interface variant and the measured metric calculated for the control interface; and executing the variant selection protocol only for interface variants for which the uplift value is positive.

20. The system of claim 17, wherein the selection metric is calculated by computing the difference between the one or more measured metrics calculated for the selected interface variant and the one or more measured metrics calculated for the control interface, multiplied by the uncertainty value, wherein the uncertainty value is determined based on a sum of a first variance of the one or more measured metrics calculated for the selected interface variant and a second variance of the one or more measured metrics calculated for the control interface.

21. The system of claim 17, wherein the operations further comprise:

generating a reporting interface for displaying a status of each interface variant of the one or more interface variants, the status representing whether or not the determined performance of the interface variant has reached statistical significance.

22. The system of claim 21, wherein the reporting interface depicts a plurality of objects, and one of the plurality of objects displays the status of each interface variant of the one or more interface variants.

* * * * *

UNITED STATES PATENT AND TRADEMARK OFFICE
CERTIFICATE OF CORRECTION

| | |
|---|---|
| PATENT NO. | : 11,997,001 B2 |
| APPLICATION NO. | : 17/014789 |
| DATED | : May 28, 2024 |
| INVENTOR(S) | : Polishchuk et al. |

It is certified that error appears in the above-identified patent and that said Letters Patent is hereby corrected as shown below:

On the Title Page

Column 1, under Prior Publication Data, Line 2, below "US 2021/0083961 A1 Mar. 18, 2021" insert -- (30) Foreign Application Priority Data Sep. 13, 2019 (UA) ............... a201909809 --, as a new field entry, therefor.

In the Specification

In Column 1, Line 10, delete "No," and insert -- No. --, therefor.

In Column 4, Line 35, delete "value" and insert -- value, --, therefor.

In Column 9, Line 57, delete ""I"" and insert -- "1" --, therefor.

In Column 11, Line 34, delete "n" and insert -- 1/n+1 --, therefor.

In Column 14, Line 25, delete "j" and insert -- $\delta_j$ --, therefor.

In Column 17, Line 28, delete "exchange)." and insert -- exchange), --, therefor.

In Column 17, Line 42, delete "servers." and insert -- servers, --, therefor.

In Column 17, Line 56, delete "servers." and insert -- servers, --, therefor.

In Column 23, Line 43, delete "IO" and insert -- I/O --, therefor.

In Column 24, Line 53, delete "Macintosh®)," and insert -- Macintosh®, --, therefor.

In Column 25, Line 22, delete "technology." and insert -- technology, --, therefor.

Signed and Sealed this
Eighth Day of October, 2024

Katherine Kelly Vidal
*Director of the United States Patent and Trademark Office*

CERTIFICATE OF CORRECTION (continued)
U.S. Pat. No. 11,997,001 B2

In Column 25, Line 37, delete "RO," and insert -- ROM, --, therefor.

In the Claims

In Column 30, Lines 58-59, in Claim 17, after "multiplied by" delete "and the selection metric including".